Nov. 9, 1926.                    1,606,132
C. T. RAY
PLOW
Original Filed Dec. 15, 1919    4 Sheets-Sheet 1

Inventor
Charles T. Ray
By C. J. Stuckman
Attorney

Nov. 9, 1926.  
C. T. RAY  
1,606,132  
PLOW  
Original Filed Dec. 15, 1919     4 Sheets-Sheet 2
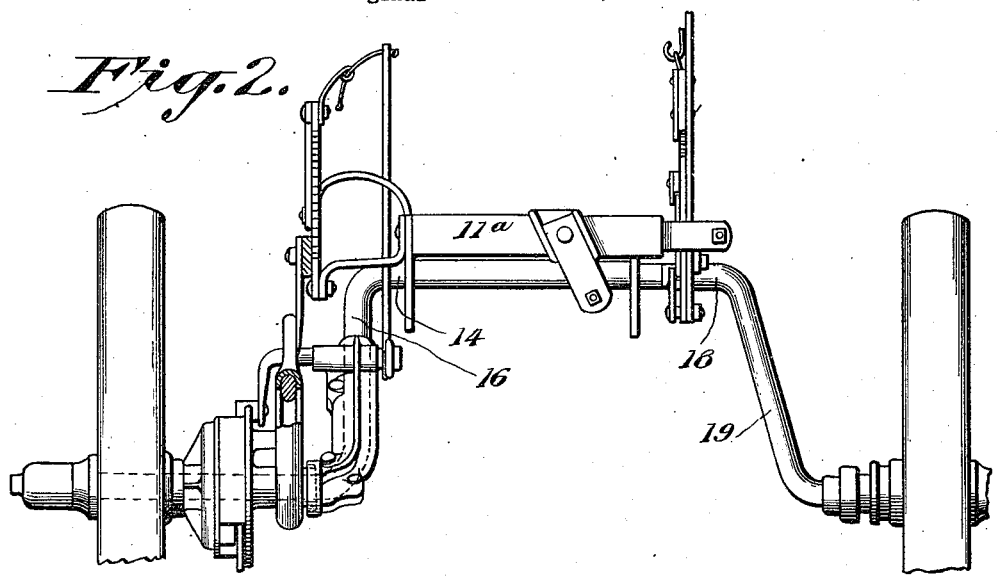
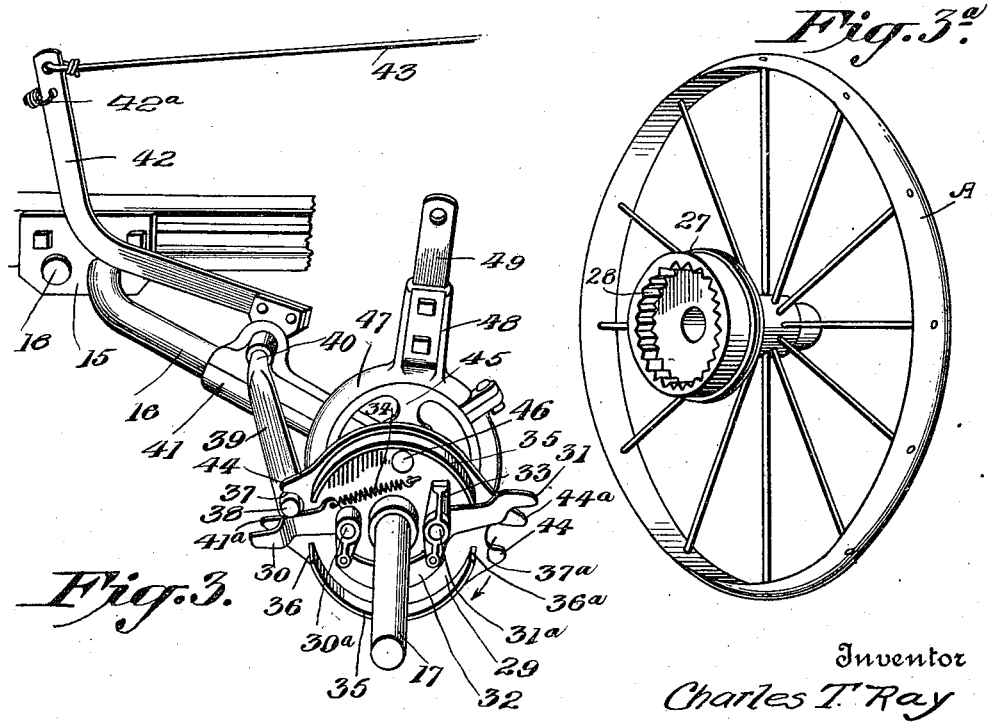
Inventor  
Charles T. Ray  
By C. J. Stockman  
Attorney

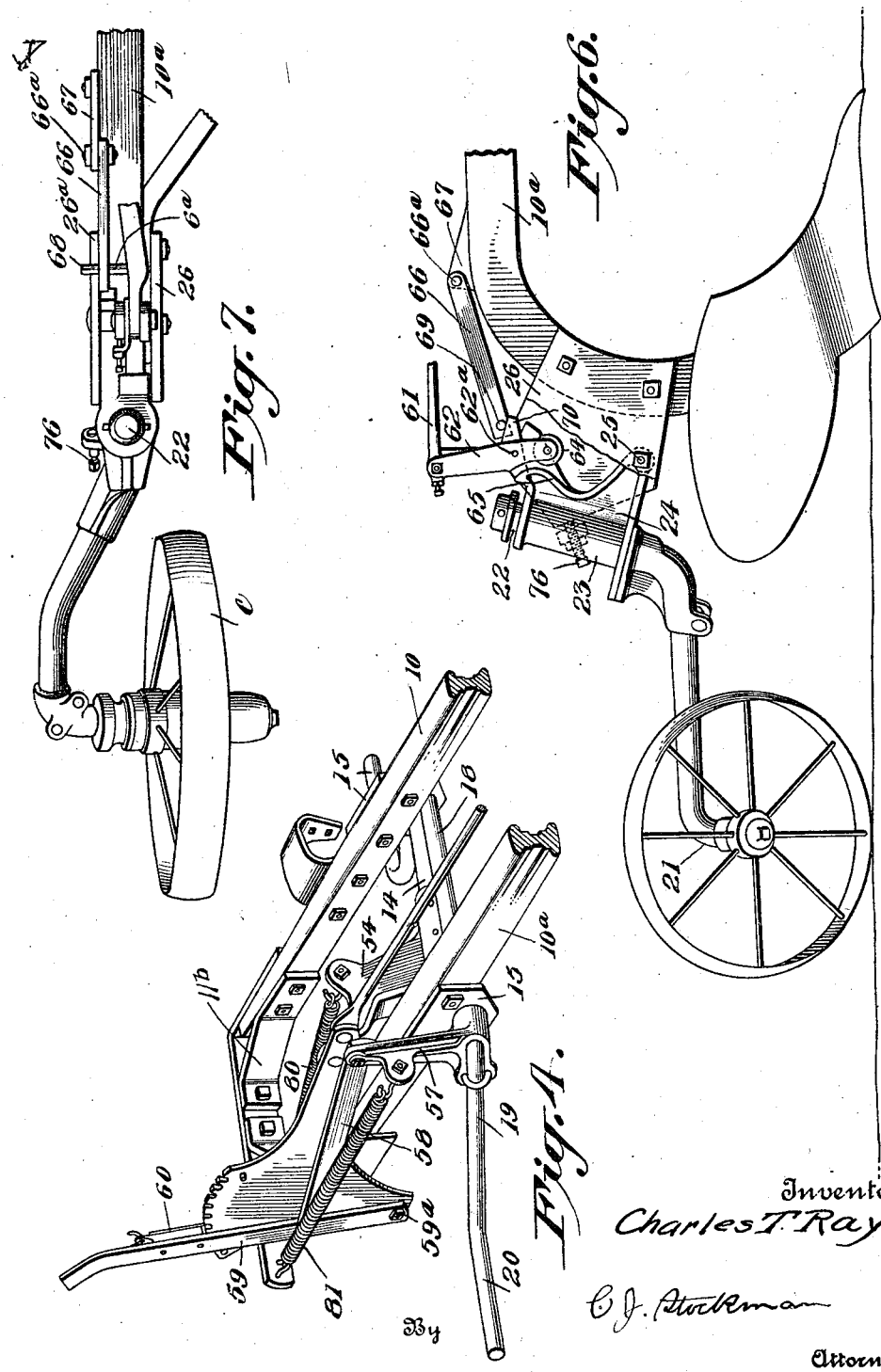

Nov. 9, 1926.                              1,606,132
C. T. RAY
PLOW
Original Filed Dec. 15, 1919    4 Sheets-Sheet 4

Inventor
Charles T. Ray
By C. J. Stockman
Attorney

Patented Nov. 9, 1926.

1,606,132

UNITED STATES PATENT OFFICE.

CHARLES T. RAY, OF LOUISVILLE, KENTUCKY, ASSIGNOR TO B. F. AVERY AND SONS, OF LOUISVILLE, KENTUCKY, A CORPORATION OF KENTUCKY.

PLOW.

Application filed December 15, 1919, Serial No. 344,962. Renewed November 16, 1925.

One of the important purposes of this invention is to simplify the means hitherto proposed to raise and lower the frame and ground working elements of a tillage implement by power derived from the travel of the implement and which means will nevertheless be most readily adjustable to produce different depths of furrows and effective in the operation of raising and lowering the ground working members out of or into ground working position. To this end, the implement is provided with a crank axle which is journaled to the frame thereof and said axle is provided with a spindle upon which a supporting wheel and a clutch are journaled, the clutch having its driving member arranged to be operated by said wheel and its driven member connected to the frame by a means, the movement of which will cause the crank axle to move pivotally with relation to the frame and thereby raise or lower the latter and which means includes a member which is settable in any one of a plurality of positions to correspondingly vary the angle of the crank portion of the axle relatively to the frame and ground to variably regulate the depth of penetration of the ground working members, the parts being thus so correlated that the rotative movements of the wheel are imparted directly to the driving member of the clutch and thence to the driven clutch member, thereby eliminating elements hitherto deemed to be necessary in mechanisms for raising and lowering the frame and ground working members by power derived from the travel of the implement without effecting the capability of adjustment to produce furrows of different depths. More particularly defined, this part of the invention includes in the connection between the driven member of the clutch and the frame, an element which rotates with the clutch and is capable of translating rotative movement into up and down movement; and still more particularly defined the connection consists of an eccentric rotative within a strap or housing having an arm which is pivoted to an adjusting lever and which adjusting lever in turn is pivoted to the frame and is mounted to be fixed by a suitable dog or latch, or the like, in any one of a plurality of positions to a toothed segment or quadrant carried by the frame.

Another of the important purposes of this invention is to provide connections whereby the front and rear ends of the implement are lowered in a peculiar timed relation and are raised in a peculiar timed relation, hereinafter fully set forth, the connections also being of such nature that they are adapted to be operated by force derived from the travel of a supporting wheel of the implement.

In the accompanying drawings I have illustrated one form of implement embodying mechanism for accomplishing the foregoing purposes, and other purposes which will be apparent, but I would have it understood that the invention may be otherwise embodied without departing from its spirit as defined by the appended claims.

In the implement selected to exemplify this invention: two soil turning members of the mold board type are illustrated and the clutch mechanism is shown as applied to the furrow wheel; but I would have it understood that the invention is not restricted to the number or to the particular kind of soil turning members employed and I would also have it understood that the clutch mechanism incorporated in the implement can be applied to any suitable wheel of the implement, although in the specific type of complete implement illustrated in the drawing, it is preferred that the clutch mechanism be applied to a furrow wheel rather than to the land wheel.

In said drawings:—

Fig. 2 is a front view of the same with parts in section.

Fig. 3 is a detail perspective view more particularly intended to show a form of clutch mechanism which may be employed to attach the furrow wheel to the axle spindle and to permit it to run free on said spindle, at will.

Fig. 3ª is a view of a wheel having one member of said clutch.

Figure 1:
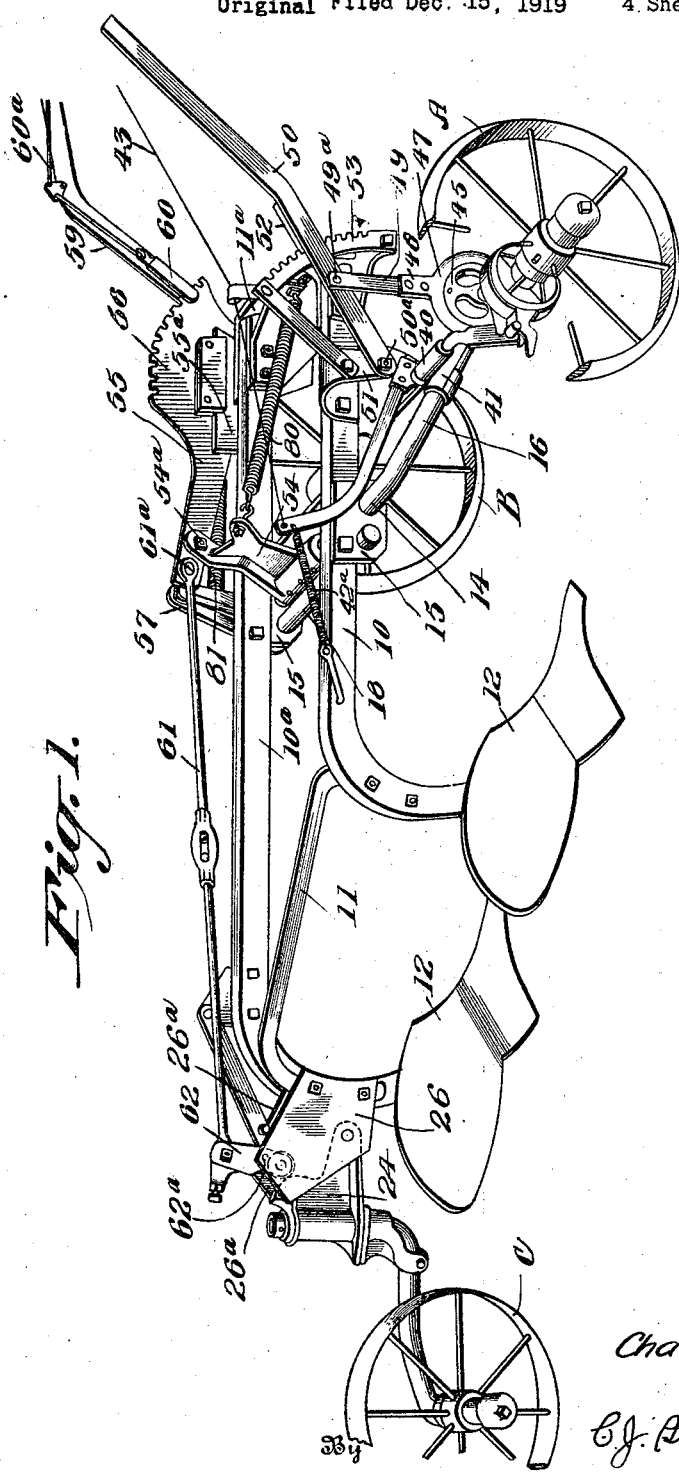
Fig. 1 is a perspective view of a gang plow embodying the present improvements, viewed from the furrow side.

Fig. 4 is a detail perspective view particularly intended to show the connection between the furrow wheel axle and the land wheel axle, this view being taken from the side of the implement opposite to that from which it is seen in Fig. 1.

Figures 5, 8:
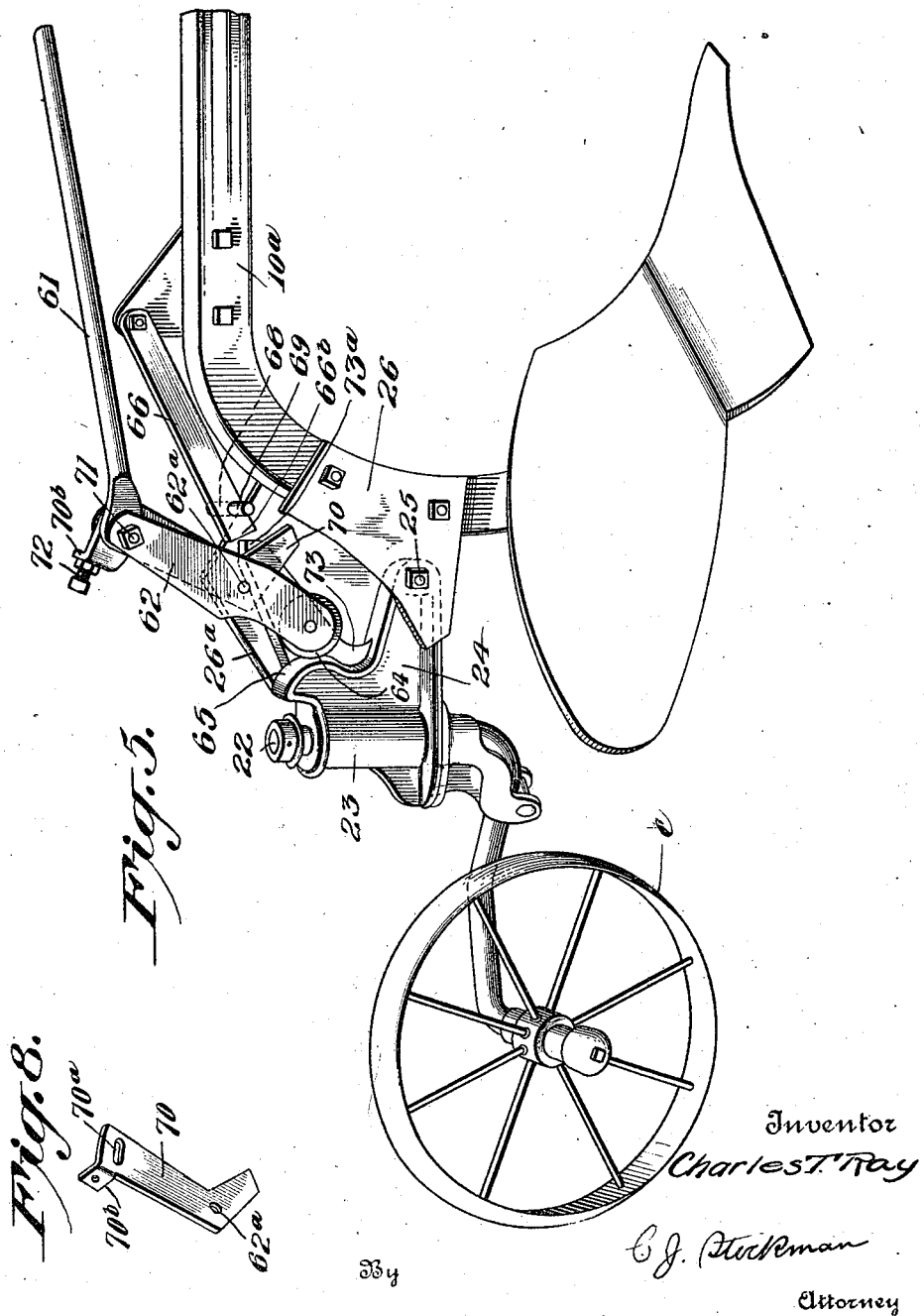

Fig. 5 is a detail perspective view of the rear end of the implement, with one of the supporting plates broken away, particularly intended to show the means whereby the rear end of the implement is raised and lowered in such timed relation to the raising and lowering of the front end of the implement that the soil turning members will leave and enter the ground at an inclination and point first, this figure showing the parts in transport position.

Fig. 6 is a side elevation of the same parts of the implement, showing their relation when the soil turning members are in working position.

Fig. 7 is a plan view of the same parts, and

Fig. 8 is a detail view of the trigger.

Similar characters of reference denote corresponding parts in the several views.

The frame here shown comprises two substantially parallel longitudinal beams 10, 10$^a$ tied together by a transverse connecting element 11 near the rear end and by a transverse front member 11$^a$ and front corner brackets 11$^b$. Each beam provides a support for a soil turning member of suitable kind connected to it in an appropriate manner. In the construction shown by way of example in the drawings, each beam has a downwardly bent rear end to which is attached a plow body 12 of the single mold-board type.

A, B and C designate the land and furrow wheels which support the implement. The front furrow wheel A and the land side wheel B in the embodiment of the invention, illustrated in the accompanying drawings, are mounted on separate crank axles for a purpose hereinafter explained. The axle to which the front furrow wheel A is connected has an upper horizontal bearing portion 14, extending across the space between the beams 10, 10$^a$ and journaled in bearing members 15 suitably attached to said beams.

It also has a downwardly extending crank portion 16 terminating at its lower end in an outwardly extending spindle portion 17. The axle to which the land wheel C is connected is of similar construction: 18 (Fig. 4) designating its upper horizontal bearing portion which is journaled in the bearing members 15; 19 designating its downwardly extending crank portion; and 20 its outwardly extending lower end. The portions 17 and 20 form spindles upon which the wheels A and B are rotatably mounted. It will be understood that when these (cranked) axles are turned in the bearing members 15 in a clockwise direction, i. e. toward the rear from the position shown in Fig. 1, the cranked portions 16 and 19 will assume a more nearly vertical position, thus elevating the forward end of the frame and lifting the plow bodies, and that when they are turned in a counterclockwise direction the forward end of the frame and the plow bodies will be lowered. Of course it will be understood that in the first named movement the wheels A and B move rearward and in the other movement said wheels move forward.

The wheel C which supports the rear end of the implement is mounted to rotate upon the lower laterally extending end 21 of a cranked axle having a vertical portion 22 which is mounted to rotate in a bearing 23 carried by a bearing member 24 pivoted upon a horizontal axis, at 25, to sustaining plates 26, 26$^a$ securely fastened to the rear end of the adjacent beam 10$^a$. It will thus be seen that wheel C has movement with its axle upon a vertical axis in the guidance of the implement, and also has movement upon a horizontal axis, about the pivot 25, to raise, and lower the rear end of the implement to and from transport position, it being noted that the wheel C moves forward in raising the rear end of the implement and rearward in lowering the same.

In order that the movements of both wheels A and B and their axles may take place simultaneously from power derived from the motion of one of said wheels in the forward travel of the implement, applied through a means forming part of mechanism which (a) also affords provision for a primary simultaneous adjustment of said axles and wheels to regulate the depth at which the soil turning members shall work and (b) affords provision for an independent adjustment of one of said axles and its wheel to level the implement and also to normally adjust the depth of plowing and in order further that there shall be a movement of the rear axle and furrow wheel C by power derived from the forward travel of one of the forward wheels A or B but automatically controlled in such manner that the rear end of the frame shall be raised and lowered in such timed relation to the raising and lowering of the front end of the frame that the soil turning members shall leave, but more especially shall enter, the soil point first, I have provided peculiar connections which are further characterized by simplicity, effectiveness, durability and the ease with which the operations may be effected. While I shall presently describe these connections in more or less minute detail, I do not thereby wish to be understood as restricting the invention to the precise details illustrated as these details may be changed without departing from the spirit of the invention or the scope of appended claims.

It is preferred in practice to utilize the furrow wheel A as the wheel from which the power for raising and lowering the implement to and from transport position is derived. Accordingly, said wheel is provided with the driving member 27 of a clutch (see Fig. 3ª). This driving member is of hub-like form and is disposed at the axis of the wheel A and has a series of internal teeth 28 arranged concentrically about the spindle 17. The driven member 29 of the clutch is rotatably mounted on the axle spindle 17 and means of any suitable nature are provided for locking this member to the driving member 27 and for releasing it therefrom, at will. One such means is illustrated by way of example. It comprises two crank shaped members having outwardly extending arms 30, 31, respectively pivoted at their inner ends within the member 29. The pivots are marked 30ª, 31ª and are on opposite sides of the spindle 17 and the members are connected with each other by a link 32 whose opposite ends are pivoted to the shorter arms of the members. The arm 31 has a lateral projection 33 forming a pawl to engage the teeth 28 in the driving member. A spring 34 is provided to urge the arms to the position they occupy when the pawl 33 is engaged with the teeth 28. The casing of the driven member 29 is shown as having a circumferential flange 35 formed at the places marked 36, 36ª with oppositely disposed openings through which the arms 30, 31 extend and adjacent to said openings it is provided with outwardly projecting portions having recesses 37, 37ª. Either recess 37, 37ª, is adapted to receive a projection 38 extending from a trip latch 39. This trip latch is pivoted at 40 to a sleeve 41 carried by the crank portion 16 of the axle. A lever 42 connected to the latch 39 and provided with a rope or cord 43 extending to within convenient reach of the operator on the tractor, (not shown) constitutes a suitable means by which the latch 39 may be manually operated to disengage its projection 38 from the adjacent arm 30 or 31. It will be understood that the projection 38 is normally engaged with one of the arms 30, 31 so that the pawl 33 is normally disengaged from the teeth 28, and that when it is desired to utilize the power means for lifting the soil turning members to transport position, or for lowering them to working position in the soil, the operator on the tractor pulls upon the cord 43, thereby moving the latch 39 and disengaging the projections 38 from the adjacent arm 30 or 31, whereupon the spring 34 becomes operative to engage the pawl 33 with a tooth of the driving member 27, thereby locking the driven member 29 to the driving member 27 and hence to the furrow wheel A. As soon as this has been done the operator ceases to pull upon the cord 43 whereupon the lever 42 and the trip latch 39 are returned to the former positions by a spring 42ª. The forward motion of the wheel A now causes the driven member 29 to turn, in the direction of the arrow, Fig. 3, one-half revolution, near the end of which movement the outwardly projecting end of the arm 31 (assuming that the implement was in transport position and is to be lowered to working position, in which case arm 30 is the one which was released at the beginning of the operation) comes into engagement with the projection 38 and held thereby, a slight further movement of the member 29 bringing its recess 37ª into full registration with the projection 38, whereupon the projection 38 becomes fully seated in the recess. It will be understood that when arm 30 was released, spring 34 became operative to force pawl 33 into engagement with a tooth of the driving member of the clutch and during its operation also imparted movement to the arms 30, 31 so that they extend across the openings 37 and hence are engaged by the projection 38 and are pressed back before said projection becomes seated. During this slight further movement, the pawl 33 is withdrawn from its engagement with the teeth 28 and the spring 34 is placed under tension. It will be noted that the projection 38 rides upon the edge of the member 29 when the latter is rotating and that said edge is formed with high parts 44, 44ª on opposite sides of each opening 36, 36ª and that the outer end of each arm 30, 31 is somewhat offset, to expedite the operation of disengaging the pawl from the driving member.

When the soil turning members are in working position the latch projection 38 will be in the recess 37ª and in engagement with the arm 31. When the frame and soil turning members are to be raised to transport position, the operator again pulls upon the cord, thereby disengaging projection 38 from arm 31, allowing the spring 34 again to engage pawl 33 with ratchet 28, whereby clutch member 29 will again turn one-half of a revolution, at the end of which movement projection 38 will engage arm 30, (thus disengaging pawl 33 from the ratchet,) and will finally be seated in recess 37 and act to hold the pawl out of engagement with the ratchet.

Each half-revolution of the member 29 imparts movement to the frame and soil turning members in an upward or downward direction, through the connections which will now be described and which constitute important parts of my improvements:

Suitably fixed to the driven member 29 is an eccentric 45. It is shown as secured to the driven member 29 at 46 and has its bearing upon the spindle 17. It turns within a cam strap 47 having a projection 48 to which is attached the lower end of an arm 49 whose upper end is pivoted at 49ª to an adjusting lever 50 whose upper end is within convenient reach of the operator on the tractor. This lever is pivoted at 50ª to a bracket 51 which is fixed to the adjacent beam 10. It is provided with a latch 52 to engage any one of the teeth of a fixed segment 53 and this latch in practice is provided with a suitable operating handle within convenient reach of the operator on the tractor. Thus, the lever may be manually adjusted to and fixed in, any one of various selected positions. These adjustments of the lever vary the angle to which the crank portion 16 of the axle is set with reference to the frame and ground. It will be noted that in this manual adjustment, the eccentric 45, strap 47 and arm 49 move as a unit about the axis 50ª and that the axle swings in its bearings in the frame, the direction of its swinging movement being forward or rearward according to the direction of movement given the lever 50. During this operation the clutch members are disengaged from each other and the wheel A runs free on the axle spindle 17. But in the operation of raising or lowering the implement by power derived from the forward travel of the implement, the lever 50 substantially forms a fixed part of the frame, the eccentric 45 rotates with the wheel A and within the eccentric strap 47 and said strap and arm turn upon the pivot 49ª. It will be understood that the high part of the eccentric 45 will be upward when the parts are in transport position and downward when they are in working position and that during the travel of the eccentric from one position to the other it exerts force upon the axle spindle 17, and turns the axle portion 14 in its bearings—the arm 49 and strap 47 in this movement swinging about the pivot 49ª, as already stated.

The journal portions 14 and 18 of the crank axles which are carried by the wheels B and A, respectively, are connected with each other by means operative to transmit raising or lowering movement from one of said journal portions to the other and which means include disconnectible elements operative to permit relative movement of said journal portions and to fix one of the carrying wheels into different selected positions with relation to the other carrying wheel. The particular means now to be described in detail are not herein claimed, broadly, since it is made the subject of a separate application for Letters Patent filed as a division hereof and in response to a requirement of division. This means comprises a crank 54 projecting from the journal portion 14, a crank 57 projecting from the journal portion 18; a slide 55, to the rear end of which the crank 54 is pivoted at 54ª; a lever 59; and a link 58 which connects the lever 59 with the crank 57. The slide 55 has a segmental toothed forward end 56 to be engaged by a latch 60, carried by the lever 59 and having an operating element 60ª which extends to within convenient reach of the operator on the tractor. The lever 59 is pivoted at 59ª to the forward end of the slide and guides 55ª are provided for said slide. It will be seen, therefore, that the lever 59 is adjustable pivotally relatively to the slide 55 and is also movable bodily back and forth with said slide. The pivotal adjustment of the lever 59 is to level the frame and to normally govern the depth of plowing, and during this particular adjustment the axle of the land wheel B is swung in its bearing 15 on the frame backward or forward as the case may be without transmitting movement to the axle of the furrow wheel A, for the reason that the latch 60 is detached from the slide 55 and the latter remains stationary. The axle of the land wheel receives motion from the lever 59 through the medium of the link 58 and crank 57, as is apparent, in leveling the frame but in moving the frame to or from transport position and also in adjusting the angle of the crank portion 16 of the furrow wheel axle by the lever 50 the axle of the land wheel is swung backward or forward from similar movement of the axle of the furrow wheel, for the reason that at this time the lever 59 is locked to the slide 55 and partakes of the slidable movement given the latter by the crank 54 and transmits movement from said slide to the crank 57, through the medium of the link 58.

The slide 55 also forms an element of a connection to the rear wheel C, or rather to the bearing member 24 which carries the axle of said rear wheel. This particular connection is of a special nature designed to control the movement of the member 24 on its horizontal axis in such manner that said movement will not extend throughout the same period as the swinging movements of the axles of the wheels A and B. In other words, the parts as so combined that whereas the movements of the wheel C in raising and lowering the rear end of the implement are under control of the parts which raise and lower the front end of the implement, yet the controlling means are of a nature such that the front end of the frame substantially reaches its lower position before the rear end commences the major part of its downward movement, and similarly, the forward end of the frame commences its upward travel before the rear end commences to rise. Hence, the soil turning members are caused to enter and leave the soil at an inclination, point downward in entering and point upward in leaving.

The illustrated means for accomplishing this very important result comprises a link 61 whose forward end is pivoted at 61ª to the slide 55 and whose rear end is pivoted to the upper end of a lever 62 which is preferably composed of spaced side members and is provided with a roller 64 at its lower end. This lever 62 is pivoted at 62ª between the fixed plates 26, 26ª and its roller 64 is arranged to traverse a curve bearing surface 65, forming a track therefor, provided by the rear edge of the bearing member 24. A latch 66 is pivoted at its front end, at 66ª, to a bracket 67 fixed to the adjacent beam 10ª and its rear end is provided with a lateral projection 68, (Fig. 7) at one side of the latch to engage the upper edge of the plate 26ª to limit the downward movement of the latch and a similar lateral projection, 69, to be engaged by the forwardly projecting end of a trigger 70. This trigger is carried by the lever 62 and is preferably adjustably fixed between the side members of said lever, being here shown as pivoted at 62ª and having its upper end provided with a slot 70ª and a lateral projection 70ᵇ (see Fig. 8). A fastening bolt 71 extends through the side members forming the lever 63 and also through an eye formed in the link 61 and through the slot 70ª in the trigger and forms a pivotal connection between the link and lever, and at the same time fastens the upper end of the trigger to the lever. An adjusting bolt 72 extending through the lateral projection 70ᵇ of the trigger forms a means for adjustably raising or lowering the end of the trigger which projects from the lever 63. In this adjustment of the trigger it turns upon the pivot 62ª and its upper end moves relatively to the bolt 71, which should be slackened to permit such adjustment.

The bearing member 24 is provided with a forward projection 73 which moves with it and is arranged at one side of the track 65 with its forward edge 73ª in position to engage the rear edge 66ᵇ of the latch 66.

The operation is as follows:—

In Fig. 5 the parts are shown in transport position. The projection 68 from the latch 66 is resting upon the rear edge of bracket member 26ª, the roller 64 on the lever 62 is engaged with the track 65 and the forward end of the member 73 is free from engagement with the rear end of the latch. In this position of the lever 62, the trigger 70 is away from the projection 69. The load or weight of the rear end of the frame is imposed on the lever 62 from the bearing member 24. If now it be desired to lower the frame, the clutch member 29 on the axle spindle 17 is engaged with the clutch member 27 on the furrow wheel A and as already set forth this causes the eccentric 45 to be turned one-half revolution and causes the cranked portions 16 and 19 of the forward axles to swing forward and their cranks 54 and 57 to swing rearward and the slide 55 to move rearward bodily. This movement of the slide 55 forces the link 61 rearward, imparting similar movement to the upper end of lever 62. This lever, being pivoted at 62ª, has its lower end thrust forward away from the track 65, thus releasing the bearing member 24 and allowing the latter to move on its pivot 25 sufficiently to bring its end 73ª against the end 66ᵇ of the latch 66. The weight of the rear end of the implement is now transferred to the latch 66 whose rear end co-operates with the forward end of the projection 73ª of the bearing member 24 to form a stop which for the time being prevents any further movement of the bearing member on its pivot 25. This occurs immediately after the beginning of the operation of lowering the front end of the implement and before the latter operation was completed. In other words, the lowering of the rear end was discontinued before it was completed and before the lowering of the front end was completed. During the time the front end of the implement is being lowered while the rear end is held by the engagement of the projection 73ª with the latch 66, the link 61 of course continues its rearward movement and the lever 63 continues to move with the link on its pivot 62ª. The trigger 70 is thus brought into engagement with the projection 69 and by a further movement of the link and lever the trigger is caused to raise the latch out of engagement with the end 73ª of the projection from the bearing member 24, thus freeing the bearing member 24 which now turns on its pivot 25, under the influence of the weight of the rear end of the implement, until stopped by the engagement of a set screw 76, carried by the member 24, with the rear of the frame plate 26ª. When this occurs the front end of the implement will have reached its lowermost position and as the implement was traveling forward during the lowering operation, it follows that the soil turning members will have been caused to enter the ground gradually and point first.

It will be noted on reference to Fig. 6 that when the soil turning members are in working position, the roller 64 is out of engagement with the track 65, the latch 66 is held out of engagement with the forward projection 73 by the trigger 70, and the thrust of the rear end of the implement is carried by the set screws 76. In the lifting operation, the operator engages the clutch members with each other as already described, thus causing the forward movement of wheel A to move the cranked portions 16 and 19 of the axles to more nearly vertical position. During this movement, the slide 55 is moved forward, thus pulling the link 61 forward. The first part of the movement of this link is consumed in moving the roller 64 into engagement with the track 65 and during this time no movement is imparted to the bearing 24, but when the lost motion introduced by spacing the wheel from the track has been taken up by the first part of the movement of the link, the connections become operative to turn the bearing member 24 upon its pivot 25 until the parts have again reached the position shown in Fig. 5. During this movement the trigger 70 is withdrawn from the projection 69 and the trigger 66 thereby is permitted to fall to the position shown in Fig. 5.

It will be noted that during the movement of the parts from and into transport position the lever 50 maintains its fixed relation to the frame and that while the lever 59 partakes of the movement of the slide 58, yet it does not turn upon its pivot in such movement and that its movement with the slide is a slight one only. Accordingly, the position of both levers is substantially the same whether the parts be in transport position or in working position and they are at all times within convenient reach of the operator on the tractor.

80 and 81 designate springs whose rear ends are connected, respectively, to the cranks 54 and 57 and whose forward ends are connected to fixed parts of the implement frame. These springs balance the weight of the implement and thereby reduce the force required to be expended in the raising of the parts.

Having thus illustrated a preferred embodiment of my invention and described the same somewhat minutely without intending thereby to restrict the protection to the particular illustrated embodiment but being mindful at all times and wishing it to be so understood that the embodiment is merely exemplary and that changes in the details may be made without departing from the spirit of the invention:

What I claim, is:—

1. A soil working implement comprising a soil working member and lowering mechanism for said member including elements operative to cause a continuous downward movement of the forward end of said member and an intermittent downward movement of the rear end thereof.

2. A soil working implement having a frame for carrying soil working members and front and rear supports for the frame, and a mechanism for successively raising the front and rear of the frame in changing from working to transport position and for successively lowering the front and rear of the frame in changing from transport to working position, said mechanism including means for effecting a step by step movement of the rear support in one direction.

3. A soil working implement having a frame for carrying soil working members and front and rear supports for the frame, and a mechanism for successively lowering the front and rear of the frame in changing from transport to working position, including means for effecting a step by step downward movement of the rear support during the lowering operation.

4. A soil working implement having a frame for carrying soil working members and front and rear supports for the frame, and a mechanism for successively raising the front and rear of the frame, in changing from working to transport position and for successively lowering the front and rear of the frame in changing from transport to working position, said mechanism including means for temporarily interrupting the movement of the rear support from transport to working position.

5. A soil working implement having a frame for carrying soil working members and front and rear supports for the frame, and a mechanism for successively lowering the front and rear of the frame in changing from transport to working position, including means for temporarily interrupting the movement of the rear support before the soil working members come into contact with the ground.

6. A soil working implement comprising a soil working member and mechanism for raising said member from its working position, including elements co-operating to cause the rear end of the member to start its upward movement later than the forward end and to travel faster than said forward end.

7. A soil working implement having a frame, a soil working member, and front and rear supports for the frame, in combination with mechanism for successively raising the front and rear of the frame in the raising of the soil working member from the ground, including elements co-operating to cause the rear end of the frame to start its upward movement later than the forward end and to travel faster than said forward end.

8. A power lift soil working implement, comprising means for supporting the front end of the implement, a soil working member carried by the implement, means operable at will with relation to said supporting means to raise or lower the front end of the soil working member by power derived from the travel of the implement, and means for supporting and raising or lowering the rear end of the soil working member in a timed relation to the raising or lowering of the front end of said member, said means being controlled by the means which raise and lower the front end of the member and including co-operating elements arranged to engage each other during a portion only of the time the front end of the member is being raised or lowered.

9. A power lift soil working implement, comprising means for supporting the front end of the implement, a soil working member carried by the implement, means operable at will with relation to said supporting means to lower the front end of the soil working member by power derived from the travel of the implement, means comprising relatively movable elements co-operating to support the rear end of the soil working member, and means controlled by the means which lower the front end of the soil working member for releasing said elements from each other, said releasing means being arranged to come into action after the front end of the soil working member has been substantially lowered, whereby the rear end of said member is upheld during a substantial part of the lowering movement of the front end thereof.

10. A power lift soil working implement, comprising a support, a soil working member carried by the support, means operable at will with relation to said support to lower the front end of the same by power derived from the travel of the implement, means operable to uphold the rear end of the support, and means controlled by the means which lower the front end of the support and operating with relation to the means which upholds the rear end of the support to withdraw the supporting action of the upholding means from the support after the front end has completed a substantial portion of its downward travel.

11. A power lift soil working implement comprising a support, a soil working member carried by the support, means operable at will with relation to the support to raise the front end of the same by power derived from the travel of the implement, a ground engaging member to carry the rear end of the support, and means controlled by the means which raise the front end of the support and operative with relation to said member to raise the rear end of the support in a timed relation to and at a greater speed than the raising of the front end of the support.

12. In a soil working implement, a ground working member, a support therefor, means to raise the front end of the support, a ground engaging member to sustain the rear end of the support, a pivoted bearing for the ground engaging member, a member to engage the bearing to turn the same pivotally, and operating connections from said member to the raising means for the front end of the support, said bearing and its engaging member being correlated to have relative movement and a non-operative relation with each other during a portion of the raising moving of the front end of the support.

13. In a soil working implement, a ground working member, a support therefor, means for raising the front end of the support, a ground wheel to sustain the rear end of the support, a pivoted bearing for the ground wheel, having a track, a roller to engage the track, and means for operating the roller to exert pressure upon the track and raise the rear end of the support under control of the means which raise the front end of the support, the track in the operative position of the rear end of the support being removed from contact with the roller to permit of lost motion thereof.

14. In a soil working implement, a ground working member, a support therefor, means for raising the front end of the support, a ground wheel to sustain the rear end of the support, a pivoted bearing for the ground wheel, having a cam faced track, a roller to engage the track, a roller carrier lever to exert pressure on the track to raise the rear end of the support, and means to operate said lever under control of the means which raise the front end of the support.

15. In a soil working implement, a ground working member, a support therefor, and means for raising the front end of the support, in combination with means for raising the rear end of the support in a timed relation to the raising of the front end of the support, including a ground wheel, a pivoted bearing for the ground wheel, an element which is spaced from the bearing when the rear end of the support is lowered, and means having connection with the means for raising the front end of the support and operating first to move said element into engagement with the bearing and then to cause it to exert pressure on the bearing to raise the rear end of the support.

16. In a soil working implement, a ground working member, a support therefor, and means for raising the front end of the support, in combination with means for raising the rear end of the support in a timed relation to the raising of the front end of the support, including a ground wheel, a pivoted bearing for the ground wheel, having a track, a wheel to traverse the track, said wheel being spaced from the track when the rear end of the support is lowered, and means for operating the wheel under control of the means which raise the front end of the support, first to move it into engagement with the track and then to cause it to exert pressure on the track to raise the rear end of the support.

17. In a soil working implement, a ground working member, a support therefor, and means for raising the front end of the support, in combination with means for raising the rear end of the support in a timed relation to the raising of the front end of the support, including a ground wheel, a pivoted bearing for the ground wheel, an element which is spaced from the bearing when the rear end of the support is lowered, adjustable means to hold the bearing against pivoted movement in the latter position, and means having connection with the means for raising the front end of the support and operating first to move said element into engagement with the bearing and then to cause it to exert pressure on the bearing to raise the rear end of the support.

18. In a soil working implement, a ground working member, a support therefor, raising and lowering means for the front end of the support, a ground wheel to sustain the rear end of the support, a pivoted bearing for the wheel, and means for controlling the pivotal movements of the bearing to raise and lower the rear end of the support, including a cam faced track having connection with the bearing, a member to engage the track, and movable relatively thereto, and operating connections between said member and the means which raise and lower the front end of the support, said track affording clearance for idle movement of the lever when the rear end of the support is in operative position.

19. In a soil working implement, a ground working member, a support therefor, raising and lowering means for the front end of the support, a ground wheel to sustain the rear end of the support, a pivoted bearing for the wheel, and means for controlling the pivotal movements of the bearing to raise and lower the rear end of the support, including a cam faced track having connection with the bearing, a lever having a roller to traverse the track and to sustain the bearing in one position, and operating connections between said lever and the means which raise and lower the front end of the support, said track affording clearance for idle movement of the lever when the rear end of the support is in operative position.

20. In a soil working implement, a ground working member, a support therefor, raising and lowering means for the front end of the support, a ground wheel to sustain the rear end of the support, a pivoted bearing for the wheel and means for controlling the pivotal movements of the bearing to raise and lower the rear end of the support, including a cam faced track having connection with the bearing, a member to engage and traverse the track, and means connecting the member to the means which raise and lower the front end of the support, said connecting means being arranged to withdraw the bearing from the track at the beginning of the downward movement of the raising and lowering means for the front end of the implement and to move it into engagement with the track and cause it to exert pressure upon the track and turn the bearing upon its pivot while the front end of the implement is being raised, said track affording clearance for idle movement of the lever when the rear end of the support is in operative position.

21. In a soil working implement, a ground working member, a support therefor, raising and lowering means for the front end of the support, a ground wheel to sustain the rear end of the support, a pivoted bearing for the wheel and means for controlling the pivotal movements of the bearing to raise and lower the rear end of the support in a timed relation to the raising and lowering of the front end of the support, including a track having connections with the bearing, a member to engage and traverse the track, operating means for said member having connection with the means which raise and lower the front end of the support and arranged to release the member from the track, at the beginning of the lowering movement of the front end, and to re-engage the member with the track and then cause it to exert pressure upon the track to turn the bearing upon its pivot, in the raising movement of the front end of the support, means to hold the bearing against pivotal movement when said member releases it at the beginning of the lowering movement of the front end of the support, and a device controlled by the lowering means for the front end of the support and operating to release the holding means from the bearing, the bearing when thus released being movable gravitationally to lower the rear end of the support.

22. In a soil working implement, a ground working member, a support therefor, raising and lowering means for the front end of the support, a ground wheel to sustain the rear end of the support, a pivoted bearing for the wheel, movable gravitationally to lower the rear end of the support, a lever having an element to sustain the thrust of the bearing, means to hold the bearing when said element has been released therefrom, and means controlled by the means which raise and lower the front end of the support, arranged to move the element away from the bearing to permit the latter to engage the holding means and then to release the holding means from the bearing, in the lowering movement of the front end of the support, and to re-engage the element with the bearing and then to cause said element to exert pressure upon the bearing, to raise the rear end of the support, during the raising movement of the front end of the support.

23. In a soil working implement, a ground working member, a support therefor, raising and lowering means for the front end of the support, a ground wheel to sustain the rear end of the support, a pivoted bearing for the wheel having a track and a projection extending rearward of the track, said bearing being movable gravitationally to lower the rear end of the support, a lever having a roller to engage the track and sustain the thrust of the bearing and arranged to traverse the track in the raising of the rear end of the support and to be disengaged from the track in the lowering of the rear end of the support, means cooperating with the projection from the bearing to hold the bearing when said roller has been released from the track at the beginning of the downward movement of the rear end of the support, a trigger carried by the lever and serving to release the holding means from the projection, said trigger being normally spaced from the holding means, and means for operating the lever under control of the means which raise and lower the front end of the support.

24. In a soil working implement, a ground working member, a support therefor, lowering means for the front end of the support, a ground wheel to sustain the rear end of the support, a pivoted bearing for the ground wheel, a pivoted member to engage the bearing and hold it against lowering movement, a lever, having a member to disengage the holding means from the bearing under control of the means for lowering the front end of the support.

25. In a soil working implement, a ground working member, a support therefor, lowering means for the front end of the support, a ground wheel to sustain the rear end of the support, a pivoted bearing for the ground wheel, a lever having a member to engage the bearing and hold the same against pivotal movement when the support is raised, means to disengage said member from the bearing under control of the lowering means for the front end of the support, means to hold the bearing against pivotal movement when the lever member has been disengaged from the bearing and means movable with the lever to disengage the holding means from the bearing.

26. In a soil working implement, a ground working member, a support therefor, lowering means for the front end of the support, a ground wheel to sustain the rear end of the support, a pivoted bearing for the ground wheel, means to hold the bearing against movement, a member to release the holding means from the bearing, and means connecting said member to the means which lower the front end of the support, said releasing member being normally spaced from the holding means and the said connections moving it progressively during the period of operation of the lowering means at the front end of the support, first through the space between the releasing member and holding means and then to cause it to release the holding means from the bearing, whereby pivotal movement of the bearing is restrained during a substantial part of the downward movement of the front end of the implement.

27. In a soil working implement, a ground working member, a support therefor having a rearwardly projecting bracket, and means for raising the front end of the support, in combination with means for raising the rear end of the support in a timed relation to the raising of the front end of the support, including a ground wheel, a bearing for the ground wheel pivoted to the bracket, an element which is spaced from the bearing when the rear end of the support is lowered, an adjustable stop carried by the bearing and engaging the bracket when the rear end of the support is lowered, and means having connection with the means for raising the front end of the support and operating first to move said element into engagement with the bearing and then to cause it to exert pressure on the bearing to raise the rear end of the support.

28. In a power lift soil working implement, the combination with a soil working member and a support therefor, of a crank axle having pivotal connection with the support, a ground wheel mounted upon the axle spindle, a clutch having its driving member connected to the wheel, means operated by the clutch to turn the axle to change the angle of the crank portion of the latter to thereby raise or lower the support and soil working member by power derived from the travel of the implement when the driven member of the clutch is connected to the driving member, said means including an eccentric connected to the driven member of the clutch in axial coincidence with the spindle, and means operable to connect the members of the clutch to each other, at will.

29. In a power lift soil working implement, the combination with a ground working member and a support therefor, of a crank axle having pivotal connection with the support, a ground wheel mounted upon the axle spindle, a clutch having its driving member connected to the wheel, an eccentric connected to the driven member of the clutch in axial coincidence with the spindle, means for connecting the members of the clutch to each other at will, and means co-operating with the eccentric to cause the angle of the crank portion of the axle with relation to the support to be changed when the eccentric is turned.

30. In a power lift soil working implement, the combination with a ground working member and a support therefor, of a crank axle having pivotal connection with the support, a ground wheel mounted upon the axle spindle, a clutch having its driving member connected to the wheel, an eccentric connected to the driven member of the clutch in axial coincidence, means for connecting the members of the clutch to each other at will, and means having connection with the support and eccentric and co-operating with the eccentric to cause the angle of the crank portion of the axle with relation to the support to be changed when the eccentric is turned.

31. In a power lift soil working implement, the combination with a ground working member and a support therefor, of a crank axle having pivotal connection with the support and provided with a spindle, a ground wheel rotatable upon the spindle, a clutch having a driving member connected to the wheel, an eccentric connected to the driven member of the clutch in axial coincidence with the spindle, means co-operating with the eccentric to change the angle of the crank portion of the axle when the eccentric is turned, and means to connect the driven member of the clutch to the driving member, at will, to thereby turn the eccentric by power derived from the travel of the implement.

32. In a power lift soil working implement, the combination with a soil working member and a support therefor, of a crank axle having pivotal connection with the support and provided with a spindle, a ground wheel rotatable upon the spindle, a clutch having its driving member connected to the wheel and its driven member mounted to rotate on the axle spindle, an eccentric connected to the driven member of the clutch in axial coincidence with the spindle, a connection between the eccentric and the support, and means to connect the members of the clutch to each other at will, to thereby utilize power derived from the travel of the implement to raise or lower the support.

33. In a power lift soil working implement, the combination with a ground working member and a support therefor, of a crank axle having pivotal connection with the frame, a ground wheel mounted on the crank axle, a clutch having its driving member connected to said wheel, and means operated by the clutch to change the angle of the crank axle to thereby raise or lower the soil working member and its support by forces derived from the travel of the implement, said means including an eccentric connected to and coaxial with the driven member of the clutch, an eccentric strap and a connection between the eccentric strap and the support.

34. In a power lift soil working implement, the combination with a soil working member, and a support therefor, of crank axles pivotally connected with the support and operable to raise and lower the same, said axles having spindles, ground wheels loosely mounted upon the spindles and mechanism co-operating with the wheels to raise and lower the support and soil working member by power derived from the travel of the implement, including a clutch having a member mounted upon one of the wheels and another member connected to the crank axle spindle, connections between the latter member and the support, cranks on the axles and means connecting the cranks with each other to transmit movement from one to the other.

35. In a power lift soil working implement, the combination with a soil working member, a support therefor, a crank axle having pivotal connection with the support, and a ground wheel having connection with the axle, of means including a rotary member mounted on the axle and operable at will by the ground wheel to vary the angle of the crank axle with relation to the frame by power derived from motion of the implement, said rotary member having a connection to the support, and said connection including an adjusting member provided with means for fixing it in selected positions with reference to the frame.

36. In a power lift soil working implement, the combination with a soil working member, a support therefor, a crank axle having pivotal connection with the support, and a ground wheel having connection with the axle, of an adjusting member having means for fixing it in selected positions, connections operated by said adjusting member to adjust the angle of the crank axle with relation to the support to thereby adjust the support and soil working member to selected working position, and means operable at will by the ground wheel and acting upon said connection to change the angle of the axle to raise or lower the support and soil working member to transport or working position, respectively, by power derived from the travel of the implement, said connections including a rotary member mounted on the axle.

37. In a power lift soil working implement, the combination with a soil working member, a support therefor, a crank axle having pivotal connection with the support, and a ground wheel having connection with the axle, an eccentric, an eccentric strap, an adjusting member having means for fixing it in selected position, an arm connected to the strap and pivoted to the adjusting member, a connection between the eccentric and the crank axle to change the angle of the crank axle when the adjusting member is adjusted or when the eccentric is turned, and means operable at will to connect the eccentric to the ground wheel to turn it by power derived from the travel of the implement.

38. In a power lift soil working implement, the combination with a soil working member, a support therefor, a crank axle having pivotal connection with the support, and provided with a spindle, and a ground wheel rotatably mounted on the axle spindle, of an adjusting member having means for fixing it in selected positions, an eccentric, an eccentric strap, an arm pivoted to the adjusting member and secured to the eccentric strap, and a clutch having its driven member mounted on the axle spindle and connected to the eccentric and its driving member connected to the ground wheel, said clutch having means operable to connect its driven member to its driving member, at will.

39. In a tillage implement, a frame, a ground working element carried thereby, a crank axle having pivotal connection with the frame and whose crank portion is provided at its free end with a lateral extension forming a spindle portion having a fixed relation with said crank portion, a supporting wheel and driving and driven clutch members all rotatively mounted on said lateral extension, the driving member of the clutch having operative connection with the supporting wheel, controllable means to connect the driving clutch member to the driven clutch member at will, and connections between the driven clutch member and the frame operative to rock the axle and thereby cause the frame to be raised or lowered by power derived from the supporting wheel when the driving clutch member is engaged with the driven clutch member, said connections including an adjusting member settable in any one of a plurality of different positions to vary the angle of the crank portion of the axle relatively to the frame to variably regulate the depth of penetration of the ground working element.

40. In a tillage implement, a frame, a ground working element carried thereby, a crank axle having pivotal connection with the frame and provided at its free end with a fixed spindle portion, a supporting wheel journaled on said spindle portion, a clutch whose driving and driven members are both journaled for rotation upon said fixed spindle portion and whose driving member receives motion directly from said wheel, means to connect the driving and driven members of the clutch with and disconnecting them from each other at will, and connections between the driven member of the clutch and the frame, operable to cause the axle to be rocked relatively to the frame, said connections including an adjusting member settable to different selected positions.

41. In a tillage implement, a frame, a ground working element carried thereby, a crank axle having pivotal connection with the frame and whose crank portion is provided at its free end with a lateral extension having a fixed relation with said crank portion, a supporting wheel journaled for rotation on said lateral extension and having a hub formed to constitute the driving member of a clutch, a driven clutch member also journaled for rotation on said fixed lateral extension of the crank axle, connections between the driven clutch-member and the frame operative to rock the axle successively in opposite directions by successive partial revolutions of said member when the latter is locked to the driving member, and humanly operable clutch control means.

42. In a tillage implement, a frame, a ground working element carried thereby, a crank axle having pivotal connection with the frame and provided at its free end with a fixed spindle portion, a supporting wheel journaled on said spindle portion, a rotatable clutch whose driving and driven members are both journaled for rotation upon said fixed spindle portion and whose driving member receives motion directly from said wheel, means to connect the driving and driven members of the clutch with and disconnecting them from each other at will, and connections between the driven member of the clutch and the frame, including an eccentric rotated by the driven member of the clutch, an eccentric strap and a connection between the eccentric strap and the frame.

43. In a tillage implement, a frame, a ground working element carried thereby, a crank axle having pivotal connection with the frame and provided at its free end with a fixed spindle portion, a supporting wheel journaled on said spindle portion, a clutch whose driving and driven members are both journaled for rotation upon said fixed spindle portion and whose driving member receives motion directly from said wheel, means to connect the driving and driven member of the clutch with and disconnecting them from each other at will, and connections between the driven member of the clutch and the frame, including an eccentric rotated by the driven member of the clutch, an eccentric strap, an adjustable lever pivotally connected with the frame, means for fixing the lever in adjusted position with relation to the frame, and a member connected to the eccentric strap and pivoted to the lever.

44. A tillage implement having a frame carrying a ground working element and a supporting means including a ground wheel having a mounting movable toward and away from the plane of the frame, a rotatable clutch mounted in co-axial relation with the ground wheel to be driven directly thereby and an eccentric connection between the driven member of the clutch and the frame operable by successive partial revolutions of the clutch to cause the wheel mounting to move toward and away from the plane of the frame, respectively, said connections including an eccentric carried by the member and a band having adjustable and pendulous connection with the frame.

45. A tillage implement having a frame carrying a ground working element and a supporting means including a ground wheel having a mounting movable toward and away from the plane of the frame, a rotatable clutch mounted in co-axial relation with the ground wheel to be driven directly thereby and an eccentric connection between the driven member of the clutch and the frame operable by successive partial revolutions of the clutch to cause the wheel mounting to move toward and away from the plane of the frame, respectively, said connections consisting of an eccentric carried by the said member with its band having a swinging link connection with the frame and means for varying the position of the pivotal mounting of the link with relation to the frame.

46. A tillage implement having a frame carrying a ground working element and a supporting means including a ground wheel having a mounting movable toward and away from the plane of the frame, a rotatable clutch mounted in co-axial relation with the ground wheel to be driven directly thereby and an eccentric connection between the driven member of the clutch and the frame operable by successive partial revolutions of the clutch to cause the wheel mounting to move toward and away from the plane of the frame, respectively, said connections consisting of an eccentric carried by the said member with its band having a swinging link connection with the frame and means including a lever carried by the frame and settable in various positions to correspondingly vary the pivotal point of said link.

47. A tillage implement having a frame carrying a ground working element, an axle having a pivotal connection with the frame and comprising crank portion having a fixed spindle portion extending laterally from its free end, a supporting wheel journaled for rotation upon said spindle portion, a clutch comprising driving and driven members both of which are journaled for rotation upon said spindle, the driving member having a direct connection with the supporting wheel, clutch control means, an eccentric directly connected to the driven member of the clutch, an adjusting lever pivoted at one end to the frame and having a latch, a toothed sector operatively related to said latch and co-operating therewith to hold the lever in any one of different selected positions, an eccentric strap, and a pendulous arm connecting the lever to the eccentric strap, substantially as described and for the purpose set forth.

In testimony whereof I affix my signature.

CHARLES T. RAY.